No. 892,959.
PATENTED JULY 7, 1908.
R. I. HENDERSON.
BELT STRETCHER.
APPLICATION FILED JAN. 3, 1908.
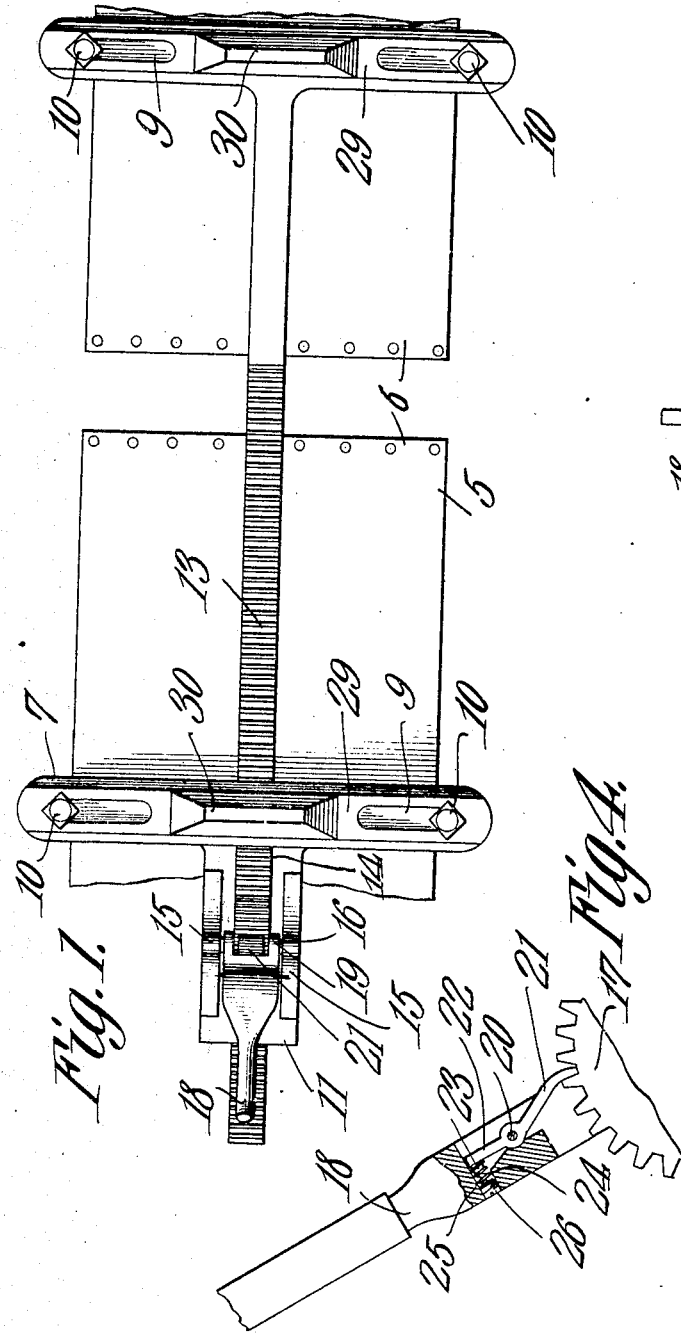
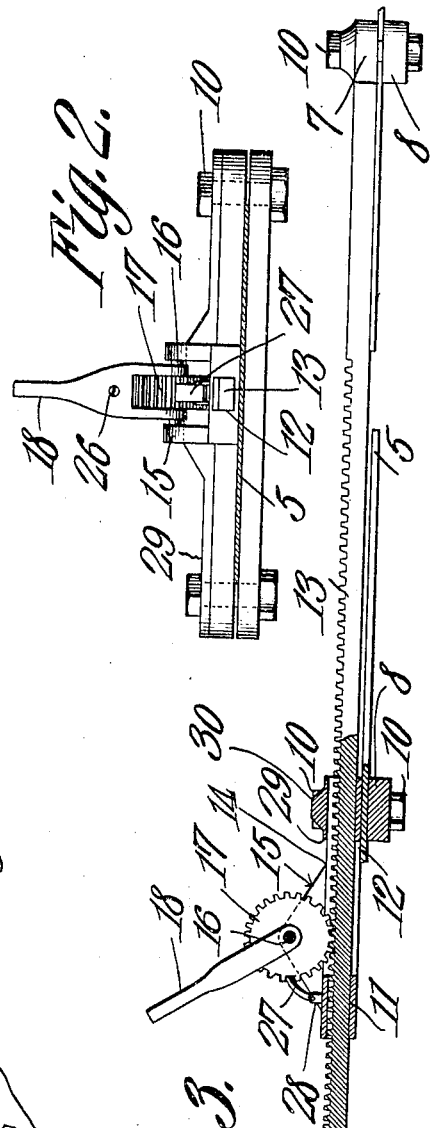
Inventor
Ralph I. Henderson.
Witnesses
By C. A. Snow & Co
Attorneys

UNITED STATES PATENT OFFICE.

RALPH I. HENDERSON, OF CAIRO, WEST VIRGINIA.

BELT-STRETCHER.

No. 892,959.  Specification of Letters Patent.  Patented July 7, 1908.

Application filed January 3, 1908. Serial No. 409,218.

*To all whom it may concern:*

Be it known that I, RALPH I. HENDERSON, a citizen of the United States, residing at Cairo, in the county of Ritchie and State of West Virginia, have invented a new and useful Belt-Stretcher, of which the following is a specification.

This invention relates to belt stretchers and has for its object to provide a comparatively simple and thoroughly efficient device of this character by means of which the adjacent ends of a belt may be drawn together and held in such a position while being laced or otherwise fastened.

A further object of the invention is to provide a belt tightener including spaced clamping members adapted to engage the adjacent ends of the belt to be united, one of said members being provided with a rack for engagement with a pinion carried by the other member so that by rotating the pinion said members may be drawn together to effect the stretching of the belt.

A still further object of the invention is generally to improve this class of devices so as to increase their utility, durability and efficiency as well as to reduce the cost of manufacture.

Further objects and advantages will appear in the following description, it being understood that various changes in form, proportions and minor details of construction may be resorted to within the scope of the appended claims.

In the accompanying drawings forming a part of this specification: Figure 1 is a top plan view of a belt stretcher constructed in accordance with my invention. Fig. 2 is an end elevation of the same. Fig. 3 is a side elevation partly in section. Fig. 4 is an enlarged detail sectional view of the lever and pawl mechanism.

Similar numerals of reference indicate corresponding parts in all of the figures of the drawings.

The improved device forming the subject matter of the present invention is principally designed for stretching belts around pulleys and drawing the adjacent ends thereof together so as to permit the insertion of a lacing cord or the like, and by way of illustration is shown in position on a machine belt of the ordinary construction in which 5 designates the belt and 6 the openings or eyelets for the reception of the lacing.

The stretcher consists of spaced clamping members each comprising mating sections 7 and 8 adapted to engage the adjacent faces of the belt and having vertically alined longitudinal slots 9 formed therein for the reception of bolts or similar fastening devices 10 by means of which said sections may be securely clamped in engagement with the belt.

The upper section 7 of one of the clamping members is formed with a longitudinal extension 11 having alined openings 12 formed therein for the reception of a rack 13 carried by the upper section 7 of the opposite clamping member, there being a longitudinal slot 14 formed in the extension to expose the teeth on the rack, as shown.

Projecting vertically from the extension 11 and preferably formed integral therewith are spaced ears or lugs 15 in which is journaled a stub shaft 16 carrying a pinion 17 the latter being adapted to engage the teeth on the rack 13 thereby to effect the stretching operation.

Mounted on the stub shaft 16 is an operating lever 18 having its lower end bifurcated to form spaced arms 19 which straddle the pinion and are journaled on the stub shaft between the pinion and the adjacent ears, as shown.

Pivotally mounted at 20 on the operating lever 18 is a pawl 21, the lower end of which engages the teeth of the pinion while the upper end thereof is provided with a lateral extension 22 forming a shoulder 23 for contact with one end of a coiled spring 24. The coiled spring 24 is mounted in a transverse recess 25 formed in the operating lever 18 and the tension of said spring is regulated by a plug 26 which engages the threaded walls of the opening 25, said plug also serving as a closure for the spring.

The free end of the pawl 21 projects between the arms 19 and extends in the path of movement of the teeth on the pinion, said pawl being so arranged that when the operating lever 18 is moved downwardly in the direction of the extension 11 the pawl will ride over the teeth on the pinion but when the operating lever is moved in the direction of the adjacent clamping member the pawl will engage the teeth on the pinion and rotate the same to draw the ends of the belt together.

As a means for locking the pinion against reverse rotation after each operation of the lever 15 there is provided a locking pawl 27 having one end thereof pivotally mounted between spaced lugs 28 on the rear end of the extension 11 with its free end bearing against the teeth on the pinion, as shown. The upper sections 7 of each clamping member are reinforced and strengthened by a longitudinal rib 29, there being a strengthening fin 30 projecting vertically from the rib 29 between the slots 9 to prevent bending or buckling of the clamping sections during the stretching operation. It will here be noted that the slots 9 pierce the ribs 29 so as to form a reinforced bearing surface for the bolts.

In operation the mating sections of the clamping members are positioned on opposite sides of the belt at the adjacent ends thereof and clamped in contact with the belt by means of the bolts 10 after which the lever 18 is operated which rotates the pinion and effects the stretching of the belt in the manner before stated. When the adjacent ends of the belt are drawn together the locking pawl 28 will prevent rotation of the pinion so that the lacing may be threaded through the eyelets in the adjacent ends of the belt to secure the same together.

From the foregoing description it will be seen that there is provided an extremely simple, inexpensive and efficient device admirably adapted for the attainment of the ends in view.

Having thus described the invention what is claimed is:

1. A belt stretcher including two pair of spaced clamping members adapted to engage the adjacent ends of a belt, one of said members being provided with a rack and the other with a longitudinal extension having alined openings formed therein for the reception of the rack, a pinion carried by the extension and engaging the teeth on the rack, an operating lever for rotating the pinion in one direction, means for locking the pinion against rotation in the reverse direction and securing bolts adjustably mounted upon each pair of clamping members.

2. A belt stretcher including spaced clamping members adapted to engage the opposite ends of the belt, a longitudinal rack bar secured to one of the clamping members, an extension formed on the other clamping member and having alined openings formed therein for the reception of the rack, and having a longitudinal slot formed in the extension to expose the teeth on the rack, ears projecting vertically from the extension, a stub shaft journaled in the ears, a pinion mounted for rotation on the stub shaft and projecting through the longitudinal slot for engagement with the teeth on the rack, a lever having its lower end bifurcated and pivotally mounted on the stub shaft, a pawl carried by the lever and engaging the teeth on the pinion for rotating the latter to effect the stretching operation, lugs secured to the extension, and a locking pawl pivotally mounted between the lugs and engaging the teeth on the pinion for locking the pinion against reverse rotation.

3. A belt stretcher including spaced clamping members, a longitudinal rack bar secured to one of said members, an extension formed in the other member and provided with alined openings for the reception of the rack, ears secured to the extensions, a stub shaft journaled in the ears, a pinion carried by the stub shaft and engaging the teeth on the rack for effecting the stretching operation, a lever having its lower end bifurcated and pivotally mounted on the stub shaft on each side of the pinion, there being a slot formed in the operating lever above the bifurcated portion thereof and having its interior walls threaded, a pawl pivotally mounted on the lever and having its lower end engaging the teeth on the pinion and its upper end formed with a lateral extension positioned in the slot in the lever, a closure engaging the threaded walls of the slot, and a coiled spring interposed between the closure and the extension on the pawl.

4. A belt stretcher including spaced clamping members each formed of mating sections adapted to engage the opposite sides of the belt and having vertically alined slots formed therein, a rack bar extending longitudinally from one of the sections of one of the clamping members, an extension formed on one of the sections of the other clamping member and having alined recesses formed therein for the reception of the rack bar, there being a slot formed in the extension to expose the teeth on the rack bar, ears extending vertically from the extension, a stub shaft journaled in the ears, a pinion carried by the stub shaft and projecting through the slot in the extension for engagement with the teeth on the rack bar, a lever pivotally mounted on the stub shaft and provided with a pawl engaging the teeth on the pinion for rotating the pinion in one direction, a pawl pivotally mounted on the extension for locking the pinion against rotation in the reverse direction, and fastening devices extending through the slots for clamping the sections of each clamping member in engagement with the belt.

5. A belt stretcher including spaced clamping members each formed of mating sections, the upper sections of which are provided with longitudinal reinforcing ribs and intermediate strengthening fins, there being alined slots formed in the sections and piercing the ribs, a rack bar secured to one of the sections of one of the clamping members, an extension projecting laterally from one of the sections of the other clamping member and provided with alined recesses for the reception of the rack bar, ears carried by the extension, a stub shaft journaled in the ears, a pinion mounted for rotation on the stub shaft, an operating lever pivotally mounted on the shaft and provided with a pawl for rotating the pinion in one direction, a spring pawl carried by the extension for locking the pinion against rotation in the opposite direction, and fastening devices extending through the slots in the clamping sections for locking said sections in engagement with the belt.

In testimony that I claim the foregoing as my own, I have hereto affixed my signature in the presence of two witnesses.

RALPH I. HENDERSON.

Witnesses:
JOSEPH D. GRIFFIN,
C. P. BARBER.